Dec. 10, 1940.  L. KAHL  2,224,685
PROCESS FOR OBTAINING VOLATILE PRODUCTS FROM BITUMINOUS SUBSTANCES
Filed June 17, 1938
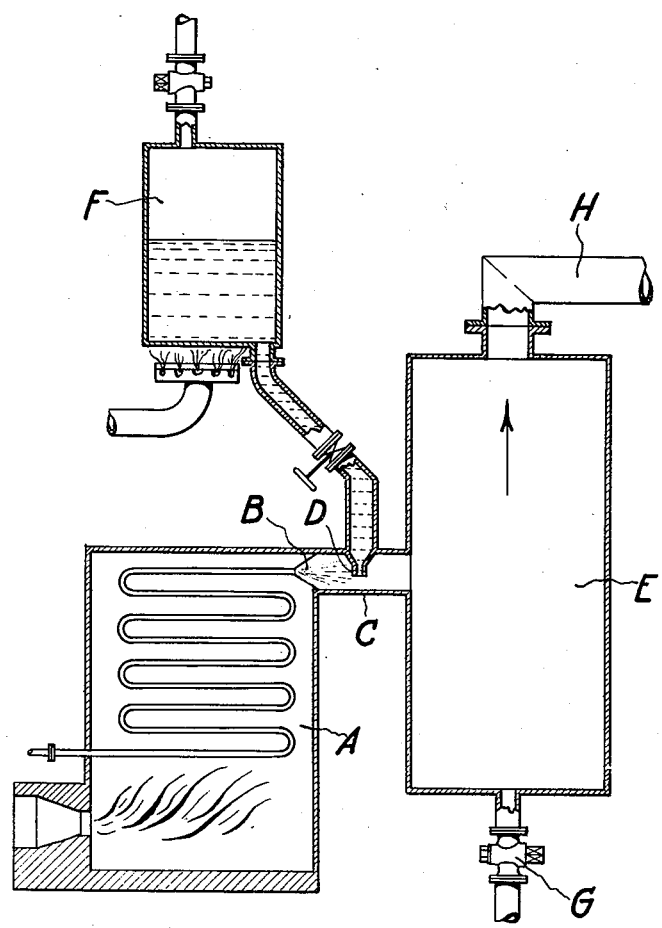
Inventor:
Leopold Kahl
By Mock & Blum
Attorneys Patented Dec. 10, 1940

2,224,685

UNITED STATES PATENT OFFICE 2,224,685

PROCESS FOR OBTAINING VOLATILE PRODUCTS FROM BITUMINOUS SUBSTANCES

Leopold Kahl, Berlin-Charlottenburg, Germany, assignor to the firm Rütgerswerke-Aktiengesellschaft, Berlin, Germany Application June 17, 1938, Serial No. 214,250
In Germany January 12, 1938

6 Claims. (Cl. 202—23)

The present invention relates to a process for obtaining difficultly volatile products from pitches, tars, bitumens, coal, resins, waxes and the like starting materials.

It is known that the recovery of the volatile constituents of the said materials is generally effected by heating, the process being defined as low temperature carbonisation or coking or as distillation. The volatile products obtained thereby are either already contained as such in the starting material or they are first formed by heating the material. In the former case the process is a distillation process, which takes place with or without decomposition of the products to be recovered, whereas in the latter case decomposition of the starting material must in any event take place to a certain extent in order first to produce distillable products from this material.

The question of the decomposition or of the degree of decomposition of the products to be recovered plays a particular part in the recovery of difficultly volatile fractions from the aforesaid starting materials. It is known that the decomposition increases rapidly if the temperature is raised. If the desired products only commence to volatilise within a temperature range which lies above their decomposition temperature, such products will decompose before they volatilise.

Various methods of reducing the danger of decomposition are already known. For example one known method is to lower the temperature of volatilisation by heating the starting material in a vacuum.

It is further known to obtain the same effect by effecting the volatilisation in the presence of substances, which at the temperature employed are present in the form of vapour or gas and owing to their considerable partial pressure correspondingly reduce the partial pressure of the substance to be volatilised. It was ascertained that the protective action of such vapours or gases, for example steam, burnt gases and the like, can be further increased by bringing the initial products, preferably in an already preheated condition, in an intimate contact with the hot vapour or gas. In some of these known processes the material under treatment is rapidly passed through highly heated zones in order to effect a volatilisation of the desired constituents. Such processes have reached a high stage of development, particularly in the field of the petroleum industry. It has been possible in this way considerably to increase the quantity of the undecomposed volatile products or considerably to reduce the decomposition of the starting materials. This result however obviously does not constitute a complete solution of the problem of recovering from the above mentioned starting materials, such as pitches, tars, coal, etc., all the constituents, which are volatile at the selected working temperature, in an undecomposed condition.

This problem is completely solved by the present invention which consists of the following steps:

The starting material is preheated to a temperature which is lower than the working temperature and at which no decomposition of the material treated occurs; the preheated starting material is heated to the working temperature selected for only fractions of seconds, for instance ⅓ to ¹⁄₃₀ second by intimately mixing said starting material with a correspondingly preheated flowing vaporous or gaseous protective substance only in a locally strictly limited zone, for instance 150 to 15 cms.; immediately thereafter the temperature of the mixture obtained is reduced, preferably by expansion and/or by introducing the mixture into an unheated expansion chamber to a temperature, at which no decomposition of the material contained in the mixture can take place. The fractions volatilised thereby are then separated from the nonvolatilised fractions. Complete volatilisation of the entire fraction volatile at the selected temperature is ensured by transferring as large a quantity of heat as possible to the starting material during the extremely short time of action of the working temperature.

The following factor determines the selection of the working temperature: Most of the aforesaid starting materials in addition to the fractions which are volatile under the working conditions of the process of this invention, also contain non-volatile fractions. Easily or difficultly volatile fractions are formed from the latter by decomposition depending on the extent of decomposition. In general there are formed by slight decomposition difficultly volatile fractions, which can be broken down into easily volatile products by more vigorous decomposition. The working temperature may be selected as desired in such a way that neither decomposition of the volatile fractions already present in the starting material, nor decomposition of the non-volatile fractions of the starting material take place. In this case separation of the volatile and nonvolatile fractions present in the substance is effected, the completeness of this separation depending on whether the working temperature is high enough to remove all, or only a certain proportion, of the difficultly volatile fractions. The working temperature may however also be increased to such an extent that slight decomposition of the non-volatile fractions of the starting material takes place, which are thereby converted into difficultly volatile fractions and separated from the remaining non-volatile fractions. The fact that such a high working temperature may be selected, without at the same time decomposition of the difficultly volatile fractions already present having to be feared, is due to the circumstance that in the aforesaid starting materials those fractions which are non-volatile are at the same time also those which are most readily liable to decomposition. This is due to the fact that these non-volatile fractions consist of very high molecular compounds of complicated structure, which are correspondingly labile, whereas the lower molecular compounds formed therefrom by slight or relatively strong decomposition are more stable. It is consequently possible by suitably increasing the working temperature to ensure that the very short period of action of this increased working temperature is sufficient to effect at least slight decomposition of the starting material.

The working temperature is so selected that, depending on the nature of the desired end product, either no decomposition at all or alternatively only slight decomposition is effected, the latter being limited to the non-volatile fraction of the starting material and being carried out until these fractions are converted into difficultly volatile constituents. The method of carrying out the process of this invention without decomposition is, for example, chiefly applicable to pitches, resins, tars and the like, whereas the method operating with slight decomposition is particularly applicable to those substances, which in themselves contain too small a proportion of volatile constituents, for example coal and bitumen of every kind. The expression "slight decomposition" is accordingly used within the meaning of this invention to indicate a decomposition which results in the conversion of non-volatile high molecular compounds into difficultly volatile compounds of likewise still relatively high molecular weight, and which, depending on the nature of the starting material may however extend both to small fractions and also to the total quantity of the starting material.

According to the present invention the action of the working temperature is limited to fractions of seconds and this limitation of the time of action is achieved by carrying out the heating of the material treated in a locally strictly limited zone whereby the sudden transfer of the maximum possible quantity of heat to the starting material is simultaneously ensured.

My invention may, for example, be carried out by introducing or spraying the starting material in an already preheated condition in the form of drops discharging from a nozzle type apparatus or in the form of a thin jet into the middle of a vaporizing tube, through which flows a highly heated jet of the vapour of the substance to be added—preferably steam. This tube discharges behind the inlet nozzle or nozzles for the starting material into a chamber, in which the expansion of the vapour attended with immediate cooling of the vapour jet and the separation of the non-volatile and volatile constituents of the starting material take place. The volatile constituents pass together with the added substance from this expansion chamber to condensation plants combined in known manner, whilst the non-volatile fractions are deposited in the chamber.

The temperature of the starting material dropped or sprayed into the vaporising tube is so selected, that it cannot in any event effect any decomposition of the starting material. The starting material either liquefies at this temperature, or liquefaction is effected in the case of substances, such as coal and the like, by admixing them with a liquid, preferably high-boiling oil.

The temperature of the vapourous or gaseous added substance, preferably steam, flowing through the vaporising tube is so selected that it is higher than the temperature, defined as working temperature, of the mixture of starting material and added substance at the moment of mixing. It is therefore correspondingly higher than the temperature of the preheated working material on its discharge from the nozzle type apparatus into the vaporising tube. The temperature of the vaporous added substance depends also on the nature of the starting material and the nature of the products to be prepared therefrom. It also depends on the proportions of starting material and added substance in the mixture, as well as on the extent of any intended decomposition of the starting material into volatile fractions. It is advisable to impart to the added substance flowing through the vaporising tube a certain vapour tension above the working pressure, in order that the expansion taking place on its entry into the expansion chamber should effect as efficient and rapid cooling as possible of the reaction mixture from the region of the working temperature. Both atmospheric pressure and also a pressure above or below atmospheric pressure may be selected as working pressure. By suitably adjusting the rate of flow of the vapour jet, correspondingly rapid passage through the inlet zone of the starting material is ensured, which in turn has a considerable influence on the shortness of the time of action at the working temperature.

The hereinbefore described embodiment of the process of this invention is diagrammatically illustrated by way of example in the accompanying drawing.

Referring to the drawing, the vapour jet of the added substance B flowing through the heating apparatus A enters the vaporising tube C, into the middle of which the nozzle type device D projects. The vapour jet entrains the starting material, which is preheated in the apparatus F, and discharges in the form of drops or a thin jet from the nozzle or nozzles of the aforesaid device D, and immediately atomises the material with simultaneous cooling to below the working temperature, into the expansion vessel F, in which if desired the expansion of the mixture may also take place. The non-volatile fractions of the starting material are deposited in E and removed through G, whilst the mixture of the volatile constituents and the added substance is conveyed through the part H to condensation apparatus.

The apparatus may vary in details from the embodiment diagrammatically illustrated in the drawing.

It is however necessary always to keep within the principle of the new process of this invention, which consists in subjecting the starting material for only fractions of seconds to the action of the highly heated vapour jet of the added substance in a locally strictly limited zone and immediately thereafter reducing the working temperature, preferably by expansion of the vapour jet or by introducing the reaction mixture into an unheated expansion chamber, to a temperature, at which no decomposition of the starting material contained in the vapour jet can take place.

The efficiency of the new process of this invention is clearly manifested in the quality of the products obtained in this manner from the aforesaid starting materials. For example from pitches there are obtained in this manner on the one hand, hard pitches of extra high softening point and, on the other hand, highly viscous oils which still maintain their high viscosity even at temperature of more than 100° C. and are obviously composed of very high molecular compounds, such as could not hitherto be obtained by other thermal processes. By mixing the hard pitches so obtained and having for example a sintering point of about 400° C., with the highly viscous oil separated by the present process from the initial pitch, the initial pitch is recovered with the same properties. This proves that practically no decomposition at all takes place in the process according to this invention if a suitable working temperature is selected.

From coal and other bituminous substances there are obtained by the process of this invention oils, which have a close affinity hitherto unknown with the starting material from which they have been obtained. This close chemical affinity is due to the very high molecular character of the resulting products and is manifested in practice in the fact that the bituminous starting materials, for example coal, can be dissolved in the oily products obtained in this manner, so that only the ash content remains undissolved. This discovery also proves the molecular structure of the resulting products, which obviously, owing to their very close chemical affinity to the initial bitumen, are capable of exerting so strong a dissolving action thereon.

The following examples, which were carried out in an apparatus corresponding to the one illustrated in the drawing, serve to illustrate the process of this invention. In the apparatus used in all of these examples the inlet nozzle D for the starting material was disposed about 20 cms. in front of the inlet into the chamber E. The rate of flow of the vapour amounted to about 5 metres per second, so that the starting material remained for about $\frac{1}{25}$ second in contact with the vapor jet at the working temperature. Reducing of the working temperature of the material-steam mixture was effected by the immediate expansion of the working pressure inside the expansion chamber. In all of these examples the process was carried out as described above.

(1) Coal-tar pitch of softening point 67° C. was heated to 380° C. and sprayed with the aid of a nozzle type device into a steam jet heated to 600° C. About 1,2 parts by weight of steam were employed for 1 part by weight of pitch. The pitch-steam mixture after passing the inlet zone in the expansion chamber was immediately reduced to a temperature of about 400° C. By separating the non-volatile residue from the volatile constituents about 33% of a pitch of very high softening point and about 65% of a very highly viscous oil were obtained. The loss amounted to about 1-2%. By mixing the distillate and residue the initial pitch with the same properties was recovered.

(2) Brown coal-tar pitch of softening point 78° C. was heated to 390° C. and sprayed with the aid of a nozzle type device into a steam jet heated to 600° C. About 1,1 parts by weight of steam were employed for 1 part by weight of pitch. The pitch-steam mixture after passing the inlet zone in the expansion chamber was immediately reduced to a temperature of about 400° C. About 40% of hard pitch and about 58% of oils were obtained by separating the non-volatile residue from the volatile constituents. The loss amounted to about 2%.

(3) Petroleum pitch of softening point 41° C. was heated to 370° C. and sprayed with the aid of a nozzle type device into a steam jet heated to 600° C. About 1,4 parts by weight of steam were employed for 1 part by weight of pitch. The pitch-steam mixture after passing the inlet zone in the expansion chamber was immediately reduced to a temperature of about 400° C. About 30% of a hard pitch having a softening point of about 150° C. and about 68% of highly viscous oils of flash point 310° C. were obtained.

(4) Coal tar heated to 380° C., from which the light-boiling constituents had been expelled, was sprayed with the aid of a nozzle type device into a steam jet heated to 600° C. About 1 part by weight of steam was employed for 1 part by weight of coal tar. The pitch-steam mixture after passing the inlet zone in the expansion chamber was immediately reduced to a temperature of about 400° C. A pitch of softening point 70° C. was obtained as residue. The quantity of the residue was lower by more than 10% than when distilling by the usual process.

(5) 40 parts by weight of coal were finely ground and stirred into 60 parts by weight of high-boiling tar oil for instance creosote oil. The mixture was heated to 380° C. and mixed in the described apparatus with steam at 600° C. in the proportion of 1:1,4. The pitch-steam mixture after passing the inlet zone in the expansion chamber was immediately reduced to a temperature of about 400° C. 32 parts of a solid residue and 66 parts of oil were obtained.

(6) 35 parts by weight of coal were dispersed in 65 parts by weight of high-boiling tar oil such as creosote oil at 380° C. The mixture having a temperature of 390° C. was mixed in the described apparatus in the proportion of 1:1-1:1,5 with steam at 600° C. The pitch-steam mixture after passing the inlet zone in the expansion chamber was immediately reduced to a temperature of about 400° C. 29 parts of residue and 70 parts of distillate were obtained, from which the high-boiling originally introduced was recovered in about the same quantity by fractional condensation.

My invention is generally applicable for obtaining volatile constituents from bituminous substances, such as pitches, tars, bitumens, coal, waxes and the like materials. In my present specification and claims the name "bituminous substance" is to be understood as including all these products and their mixtures. By "working temperature" in my present specification and claims it is to be understood temperatures are those at which the vaporisation of the volatile constituents desired after the mixing of the starting material and the material to be added and before discharging said mixture into an expansion chamber takes place. The pressure maintained in this mixture before discharging it into the expansion chamber is denoted as "working pressure."

I claim:

1. A process for obtaining difficultly volatile products from a bituminous substance selected from the group consisting of pitches, tars, bitumens, waxes and mixtures of coal with tar oils, comprising the following steps: said bituminous substance is preheated to a temperature of 370° to 390° C., and is mixed with a flowing steam of about 600° C. for fractions of a second in a locally strictly limited zone; the temperature of the mixture obtained is immediately thereafter reduced to about 400° C. by introducing said mixture under reduced pressure into an unheated expansion chamber, and the volatilized vapors, which are substantially uncracked, are separated from the non-volatile residue which is substantially only slightly cracked by the process.

2. A process for obtaining difficultly volatile oils from a bituminous pitch selected from the group consisting of coal tar pitch, brown coal tar pitch and petroleum pitch, comprising the following steps: said bituminous pitch is preheated to a temperature of 370° to 390° C., and is mixed with flowing steam of about 600° C. for fractions of a second in a locally strictly limited zone; the temperature of the mixture obtained is immediately thereafter reduced to about 400° C., by introducing said mixture under reduced pressure into an unheated expansion chamber, and the volatilized vapors, which are substantially uncracked, are separated from the non-volatile residue which is substantially only slightly cracked by the process.

3. A process for obtaining difficultly volatile products in an essentially undecomposed state from a mixture of fused coal and high-boiling tar oil, comprising the steps of mixing the bituminous coal with a high-boiling tar oil and preheating the mixture obtained to 380° to 390° C.; further heating said preheated mixture by mixing it with flowing steam of about 600° C., in a locally strictly limited zone; immediately thereafter reducing the temperature of the mixture obtained to about 400° C., by introducing said mixture under reduced pressure into an unheated expansion chamber, and causing the vaporized fractions to be separated from the non-volatile fractions, said volatile vapors being substantially uncracked and the residue only silghtly cracked by the process.

4. A process for obtaining difficultly volatile products from a bituminous substance selected from the group consisting of pitches, tars, bitumens, waxes and mixtures of coal with tar oils, comprising the following steps: said bituminous substance is preheated near to its decomposition temperature to a temperature at which said substance is liquid or liquefied, at which, however, no decomposition occurs; said preheated bituminous substance is then further heated slightly above its decomposition temperature for fractions of a second by mixing said preheated bituminous substance in a locally strictly limited zone with a flowing vaporous or gaseous substance which is selected from the group consisting of steam and burnt gases and is preheated above the decomposition temperature of said bituminous substance; the temperature of the mixture obtained is immediately thereafter reduced, by introducing said mixture under reduced pressure into an unheated expansion chamber, in which the heat of the mixture will vaporize the volatile constituents at a temperature at which no decomposition can take place; the volatilized fractions thus obtained, which are substantially uncracked, are separated from the non-volatile residue which is substantially only slightly cracked by the process.

5. A process for obtaining difficultly volatile products from a bituminous substance selected from the group consisting of pitches, tars, bitumens, waxes and mixtures of coal with tar oils, comprising the following steps: said bituminous substance is preheated near to its decomposition temperature to a temperature at which said substance is liquid or liquefied, at which, however, no decomposition occurs; said preheated bituminous substance is then further heated for fractions of a second slightly above its decomposition temperature to a temperature at which during said period of fractions of a second essentially no decomposition occurs, by mixing said preheated bituminous substance in a locally strictly limited zone with a flowing vaporous or gaseous substance which is selected from the group consisting of steam and burnt gases and is preheated above the decomposition temperature of said bituminous substance; the temperature of the mixture obtained is immediately thereafter reduced, by introducing said mixture under reduced pressure into an unheated expansion chamber, in which the heat of the mixture will vaporize the volatile constituents at a temperature at which no decomposition can take place; the volatilized fractions thus obtained, which are substantially uncracked, are separated from the non-volatile residue which is substantially only slightly cracked by the process.

6. A process for obtaining difficultly volatile products from a bituminous substance selected from the group consisting of pitches, tars, bitumens, waxes and mixtures of coal with tar oils, comprising the following steps: said bituminous substance is preheated near to its decomposition temperature to a temperature at which said substance is liquid or liquefied, at which, however, no decomposition occurs; said preheated bituminous substance is then further heated slightly above its decomposition temperature to a temperature at which during said period of fraction of a second slight decomposition occurs, by mixing said preheated bituminous substance in a locally strictly limited zone with a flowing vaporous or gaseous substance which is selected from the group consisting of steam and burnt gases and is preheated above the decomposition temperature of said bituminous substance; the temperature of the mixture obtained is immediately thereafter reduced, by introducing said mixture under reduced pressure into an unheated expansion chamber, in which the heat of the mixture will vaporize the volatile constituents at a temperature at which no decomposition can take place; the volatilized fractions thus obtained, which are substantially uncracked, are separated from the non-volatile residue which is substantially only slightly cracked by the process.

LEOPOLD KAHL.